United States Patent [19]

West et al.

[11] Patent Number: 5,114,275

[45] Date of Patent: May 19, 1992

[54] PROCESS AND WASTE PIT LINER FOR IMPROVED HYDROPHOBIC WASTE STORAGE

[76] Inventors: Philip W. West, 605 Nelson Dr., Baton Rouge, La. 70808; William H. Daly, 1135 Lakeview Dr., Baton Rouge, La. 70819

[21] Appl. No.: 662,388

[22] Filed: Feb. 26, 1991

Related U.S. Application Data

[63] Continuation of Ser. No. 119,900, Nov. 10, 1987, abandoned, which is a continuation-in-part of Ser. No. 833,513, Feb. 21, 1986, abandoned, which is a continuation-in-part of Ser. No. 555,683, Nov. 28, 1983, abandoned.

[51] Int. Cl.$^5$ .............................. B09B 1/00
[52] U.S. Cl. ........................ 405/128; 405/270; 106/900
[58] Field of Search ............... 252/628, 631, 634, 635; 405/128, 129, 266, 267, 268, 270; 106/900

[56] References Cited

U.S. PATENT DOCUMENTS

| | | | |
|---|---|---|---|
| 3,943,078 | 3/1976 | Tames | 524/563 |
| 3,953,975 | 5/1976 | Busler et al. | 405/264 |
| 4,028,130 | 6/1977 | Webster et al. | 405/129 |
| 4,124,405 | 11/1978 | Quienot | 210/751 |
| 4,166,709 | 9/1979 | Valiga | 405/128 |
| 4,255,067 | 3/1981 | Wright | 405/129 |
| 4,362,434 | 12/1982 | Valiga et al. | 405/128 |
| 4,381,026 | 5/1983 | Drake et al. | 252/628 |
| 4,383,928 | 5/1983 | Sherwood et al. | 210/751 |
| 4,405,512 | 9/1983 | Filter et al. | 252/628 |
| 4,432,666 | 2/1984 | Frey et al. | 405/129 |
| 4,439,062 | 3/1984 | Kingsbury | 405/129 |
| 4,454,047 | 6/1984 | Becker et al. | 210/705 |
| 4,459,212 | 7/1984 | Carini | 252/628 |
| 4,501,788 | 2/1985 | Clem | 405/107 |
| 4,514,307 | 4/1985 | Chestnut et al. | 210/751 |
| 4,534,925 | 8/1985 | Harriett | 405/128 |
| 4,765,908 | 8/1988 | Monick et al. | 210/666 |

FOREIGN PATENT DOCUMENTS

| | | | |
|---|---|---|---|
| 2430371 | 1/1976 | Fed. Rep. of Germany | 405/128 |
| 0230439 | 12/1985 | Fed. Rep. of Germany | 405/129 |
| 0148498 | 6/1977 | Japan | 252/628 |
| 6160699 | 12/1981 | Japan | 252/633 |
| 2107917 | 5/1983 | United Kingdom | 252/631 |

OTHER PUBLICATIONS

Encyclopedia of Polymer Science and Technology, vol. 6, John Wiley & Sons, New York, pp. 1–51.

*Primary Examiner*—Brooks H. Hunt
*Assistant Examiner*—Ngoclan T. Mai
*Attorney, Agent, or Firm*—William David Kiesel; Robert C. Tucker

[57] ABSTRACT

A process for improved hydrophobic waste storage is described wherein a latex comprising a preformed, high molecular weight polymer having a high affinity for hydrophobic liquids, is sprayed on the waste prior to admixing an inorganic matrix material. Alternately, a liner for use in a waste pit which is to contain hydrophobic waste liquids or concentrated aqueous salt solutions is produced in situ by blending and compacting a latex comprising a hydrophobic polymer and clay onto the surface of the waste pit.

36 Claims, 3 Drawing Sheets

FIGURE 3

| Test No. | Molding Moisture % | Dry Density (pcf) | Polymer Data Type | Polymer Data Content % | Permeant Chemical | Coefficient of Permeability (cm/sec.) Phase 1 Water | Phase 2 Chemical | Phase 3 Water | Total PVR % | Ratio Kc/Kw |
|---|---|---|---|---|---|---|---|---|---|---|
| 1 | 33 | 85 | None | — | Perchlor | $3.5 \times 10^{-9}$ | $2.2 \times 10^{-6}$* | $2.2 \times 10^{-8}$ | 88 | 630+ |
| 2 | 33 | 85 | None | — | Perchlor | $6.5 \times 10^{-9}$ | $1.5 \times 10^{-6}$* | — | 72 | 230+ |
| 3 | 33 | 84 | 12 | 0.5 | Perchlor | $2.2 \times 10^{-8}$ | $8.6 \times 10^{-8}$ | $9.0 \times 10^{-9}$ | 51 | 3.9 |
| 4 | 33 | 84 | 12 | 1.0 | Perchlor | $3.3 \times 10^{-9}$ | $2.2 \times 10^{-8}$ | $2.0 \times 10^{-9}$ | 40 | 6.6 |
| 5 | 29 | 87 | 12 | 2.0 | Perchlor | $2.8 \times 10^{-9}$ | $1.0 \times 10^{-9}$ | $9.0 \times 10^{-10}$ | 10 | 0.3 |
| 6 | 33 | 84 | 12 | 5.0 | Perchlor | $2.1 \times 10^{-8}$ | $3.2 \times 10^{-9}$ | $8.0 \times 10^{-9}$ | 41 | 0.1 |
| 7 | 33 | 85 | 11 | 5.0 | Perchlor | $1.7 \times 10^{-8}$ | $1.4 \times 10^{-7}$ | — | 69 | 8.0 |
| 8 | 33 | 85 | 20 | 5.0 | Perchlor | $1.3 \times 10^{-9}$ | $8.7 \times 10^{-9}$ | — | 18 | 6.7 |
| 9 | 27 | 87 | None | — | Brine | $1.3 \times 10^{-9}$ | $4.1 \times 10^{-6}$* | — | 111 | 1180+ |
| 10 | 39 | 78 | None | — | Brine | $2.2 \times 10^{-9}$ | $2.6 \times 10^{-6}$* | — | — | 3150+ |
| 11 | 32 | 82 | 12 | 1.0 | Brine | $2.4 \times 10^{-9}$ | $3.0 \times 10^{-9}$ | — | 19 | 1.3 |
| 12 | 36 | 79 | 12 | 2.0 | Brine | $3.8 \times 10^{-9}$ | $2.5 \times 10^{-9}$ | $2.5 \times 10^{-9}$ | 23 | 0.6 |

Polymer type 11, Sytrene-butadiene latex produced by Copolymer
Polymer type 12, Goodrite 2570X59 carboxymodified sytrene-butadiene latex
Polymer type 20, Geon 460X46 vinyl chloride acrylic copolymer latex

* Permeability still increasing when Phase 2 terminated.
PVR: Theoretical replacement of total pore volume by chemical Clay used for all tests is an illite-montmorillonite with Liquid Limit = 62

PROCESS AND WASTE PIT LINER FOR IMPROVED HYDROPHOBIC WASTE STORAGE

RELATED APPLICATIONS

This is a continuation of copending application Ser. No. 07/119,900 filed on Nov. 10, 1987 now abandoned, which is a continuation-in-part application of U.S. patent application Ser. No. 06/833,513 filed by the inventors herein on Feb. 21, 1986, (abandoned) which was a continuation-in-part application of U.S. patent application Ser. No. 06/555,683 filed by the inventors herein on Nov. 28, 1983. Specific mention of the prior applications is being made herein to obtain the benefit of their filing date.

BACKGROUND OF THE INVENTION

1. Field of the Invention

This invention relates generally to methods for storage of waste products, and more particularly to methods of storage of hydrophobic waste material and concentrated aqueous salt solutions.

2. Prior Art

In today's industrialized society, disposal of hazardous waste materials has become a major concern. Because of the wide variety of waste materials involved, varying degrees of difficulty have been encountered in finding methods to safely treat these waste materials prior to storage or transportation. Prevention of water infiltration into porous soil surfaces is relatively easy to accomplish by treating the soil with water soluble polyelectrolytes. These soil conditioning processes are described in the following U.S. patents:

| U.S. Pat. No. | Inventor | Issue Date | Title |
| --- | --- | --- | --- |
| 2,703,276 | Hedrick, et al | 3/01/55 | Soil-Conditioning Fertilizer |
| 2,751,367 | Yost, et al | 6/19/56 | Firable Polyacrylate Powders |
| 2,868,758 | Edgar B. Baker | 1/13/59 | Method of Improving Soil |
| 3,016,713 | John M. Deming | 1/16/62 | Method of Treating Soil With Aqueous Slurry of Lattice Clay and Anionic Polyelectrolyte |
| 3,772,893 | Louis H. Eilers | 11/20/73 | Soil Sealing Method |
| 4,255,067 | John C. Wright | 3/10/81 | Disposal of Liquid Waste and Recovery of Metals Therefrom |
| 4,277,203 | Reed, et al | 7/07/81 | Soil Stabilization Materials and Methods |
| 4,291,069 | Richard J. Pilny | 9/22/81 | Rendering Porous Structures Impermeable By Treatment With Gellable Amine Polymers |
| 4,350,461 | Valiga, et al | 9/21/82 | Multiple Waste Disposal Vaults |
| 4,362,434 | Valiga, et al | 12/07/82 | Permanent Disposal Vault For Hazardous Chemical Waste Materials |

These methods have been reasonably successful in immobilizing dilute solutions of water soluble compounds, but are not effective in immobilizing concentrated salt solutions or non-water soluble compounds. Other methods such as those disclosed in U.S. Pat. No. 3,196,619 Shock, issued Jul. 27, 1965 and entitled "Method For Disposing of Harmful Organic Waste Materials," and U.S. Pat. No. 4,255,067 Wright, issued Mar. 10, 1981 and entitled "Disposal of Liquid Waste and Recovery of Metals Therefrom" have been tried, but have not met with sufficient success to replace the present practices in the industry which include the storage of the waste in metal drums and the like, or the building of conventional clay-lined beds to hold the wastes.

Clay liners were considered adequate for the construction of hazardous waste landfills because they provided relatively secure confinement of aqueous wastes. However, clay liners are subject to tension cracks, and attack by both organic materials and brines. When clay barriers are used with hazardous waste mixtures, permeation of the barrier can occur rapidly as the clay barrier develops cracks due to geological or chemical stress. To assure protection of groundwater against potential contamination, a containment barrier technology involving double liner systems has emerged. Impermeable plastic films (geomembranes) are laid on clay barriers to form liners with double security, which is necessary because the geomembranes are also subject to puncture and attack by waste mixtures.

A number of materials have been evaluated as primary liners for landfills, but the number of acceptable geomembranes for this application is relatively limited. Consideration of the design requirements pertaining to liners reveals the cause for the limitations. The requirements include:

1. All newly sited landfills must have liners that are designed, constructed and installed to prevent any migration of wastes out of the unit to the adjacent subsurface soil, groundwater or surface water at any time during the active life of the facility. Clearly, the geomembrane must be selected to contain the most chemically aggressive material in the landfill for extended periods of time, preferably for decades.

2. Liners must be constructed of materials that have compatible chemical properties and sufficient strength and thickness to prevent failure due to pressure gradients, including static heads and external hydrogeologic forces. In addition the liners must be capable of withstanding adverse climatic conditions, the stress of installation and the stress of daily operations.

3. The liner must be placed upon a foundation or base (secondary liner) capable of providing support to the liner and resistance to pressure gradients above and below the liner. The foundation must be designed to prevent failure of the liner due to settlement, compression or uplift.

The design requirements for these liner systems is to achieve and retain a continuous, deformable and relatively homogeneous medium which minimizes the hydraulic conductivity (currently less than $1 \times 10^{-7}$ cm/sec) during the lifetime of the facility and hence prevent migration of the contaminents. Although geomembranes have gained increasing use in such facilities, their use in practice are associated with problems pertaining to:

1. puncture and tearing/pullout of the seams,
2. deterioration of the integrity of the geomembrane in contact with leachates containing a high amount of organic contaminents. Therefore, it is of common practice to use geomembranes in conjunction with compacted earthen barriers (secondary liners). The major practical difficulties in achieving the design criteria with earthen barriers are identified as:

a. the effect of structural discontinuities of the in situ hydraulic conductivity of compacted earthen barriers,
b. volume changes induced by different leachate composition and the resulting post construction tension cracks,
c. disruption of the integrity of the earthen barrier due to excessive differential or total settlements,
d. incompatibility in deformation behavior of the relatively thin extensible geomembrane and stiffer earthen barriers.

Assured long term retention of diverse chemical wastes is difficult to achieve with geomembranes composed of single materials supported by compacted clay secondary liners. As more complex mixtures of materials are combined into a single liner, the compatibility and ultimately the long term stability of the primary liner must be questioned. Most of the major manufacturers of geomembranes are actively pursuing research on new liner compositions in an effort to find an acceptable solution to the retention problem. However, little attention has been paid to the potential enhanced security which could be contributed by the secondary liner.

Harriett, U.S. Pat. No. 4,534,925 discloses a method of mixing non-hydrated bentonite clay with polypropene, polybutene or mixtures thereof. The mixture may be extruded in the form of sheets to provide a water barrier. The above composition has several drawbacks as a waste pit liner including susceptability to attack by organic solvents, requirements of at least 15% by weight of polymers and need for non-hydrated clay as a starting material.

Another treatment method for liquid waste is encapsulation. Examples of encapsulation can be found in Filter et al, U.S. Pat. No. 4,405,512 and Drake et al, U.S. Pat. No. 4,382,026. Filter, et al show how to form an emulsion of a resin and a waste liquid followed by curing the resin to encapsulate the waste liquid. Drake et al show an improvement over Filter et al in which the organic components of a liquid waste are absorbed by swellable polymer beads thereby preventing the organic components from plasticizing the resin. In both of the aforementioned patents, all of the liquid waste, aqueous and organic, is encapsulated with no volume reduction. Drake et al teach the use of non-coalescent, gelled polymer particles, recommending gentle agitation and particles having a size range from 0.1 to 1 mm in diameter. Wicking agents are recommended to avoid a prohibitively long organic liquid uptake time by the beads.

SUMMARY OF THE INVENTION

Therefore, it is an objective of this invention to provide a process for improving the engineering performance of clay or earthen barriers by producing hazardous waste pit primary or secondary liners from polymer modified clay.

Another object of this invention is to provide a liner which comprises clay in its naturally moist state modified with a minimum of additives.

Another object of this invention is to provide a clay treatment process which does not significantly effect the workability of the clay used to form a liner.

Another object is to produce a more homogeneous medium minimizing the tension cracks.

Still another object is to form a more ductile medium and hence a better deformation compatibility with the geomembrane and underlying soil layers.

Still another object is to produce a polymer modified clay barrier with a higher organic/inorganic contaminant sorption capability which is effective in containing non-polar, organic wastes and concentrated brine solutions.

Another object of this invention is to provide a process for isolating the non-polar organic components of a hazardous liquid waste.

Still another object is to provide an organic component isolation process with efficient absorption by a polymer followed by relatively inexpensive phase separation of the polymer from the liquid waste.

Accordingly, a process for isolating the organic components of a hazardous liquid waste is provided comprising the steps of forming a mixture of the liquid waste and a latex comprising hydrophobic polymer particles dispersed in a continuous liquid phase, agglomerating the polymer particles by adsorbing the polymer particles on a matrix material, and separating the matrix material with polymer particles from the unabsorbed liquid in the mixture.

Alternatively, the latex can be blended with clay. The blended material can be used to line a hazardous liquid waste pit.

BRIEF DESCRIPTION OF THE FIGURES

FIG. 3 is a table summarizing test results described below.

PREFERRED EMBODIMENTS OF THE INVENTION

Figure 1:
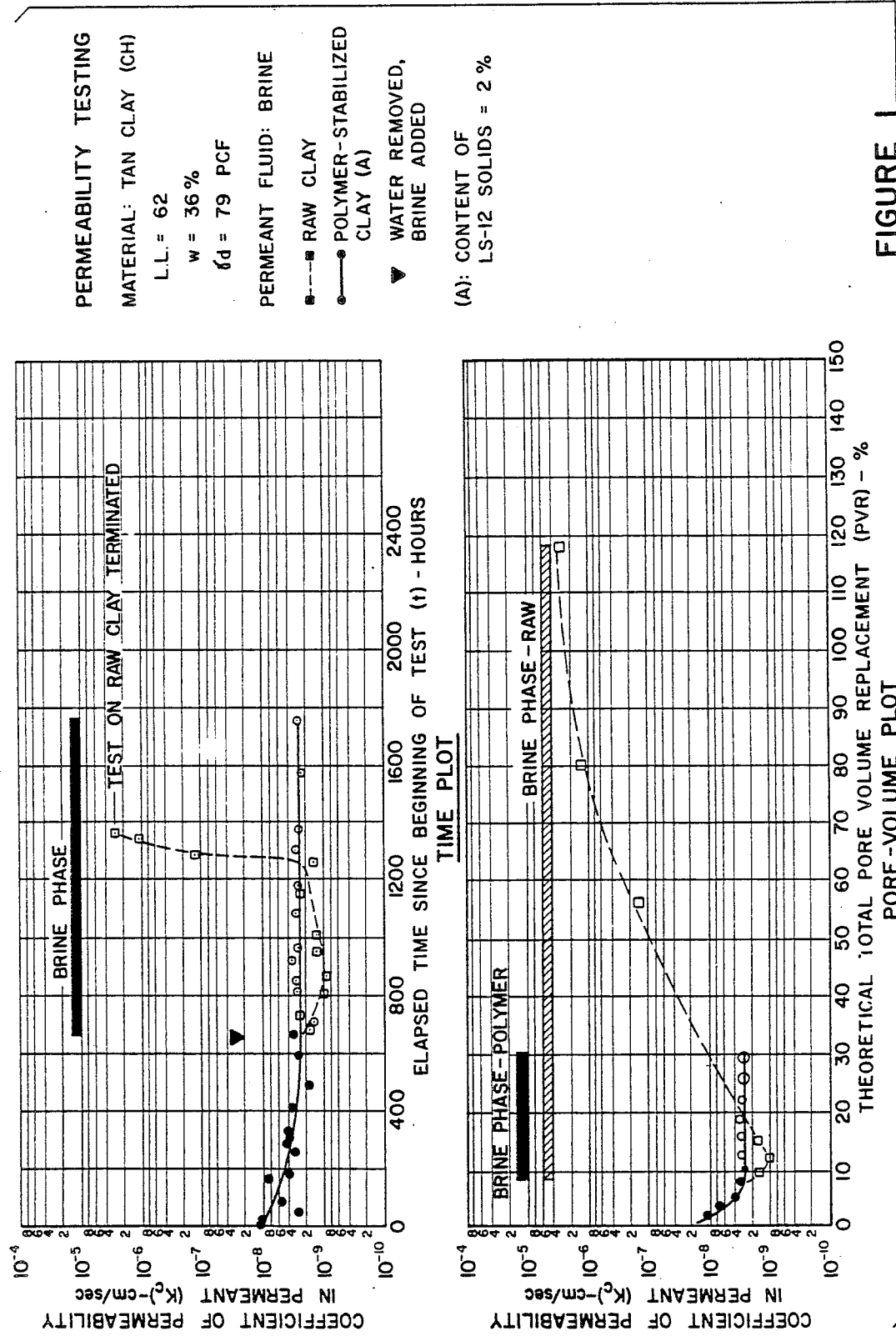
FIGS. 1 and 2 are graphic representations of test results described below.

It has been discovered that preformed high molecular weight polymers having a high affinity for hydrophobic liquids may be used in conjunction with high surface area inorganic adsorbants to reduce the volatility, solubility and mobility of organic wastes that have been stored in waste disposal cells. For the purpose of this patent, a polymer is considered to have a high affinity for hydrophobic liquids if it will absorb at least an equal weight of the hydrophobic liquid. Polymers with cohesive energy densities comparable to polystyrene are preferred to accomplish this purpose. In another preferred embodiment, polymers with cohesive energy densities in the same range as the waste components are used.

More preferably, polymers prepared in conventional manners to exhibit hydrophobic properties can be used to accomplish the absorbative phase of the process. These would include polystyrene and polystyrene derivatives such as polyvinyltoluene, polyalkylstyrenes, carboxylated polystyrenes, alkoxylated polystyrenes and halogenated polystyrenes as well as polyvinyl chloride, polyisobutylene, polybutadiene, polychloroprene, polyalkyl methacrylates and acrylates, polyvinyl pyridines and polyvinyl ethers. It is understood that random, block or graft copolymers, derived from various combinations of the monomers used to prepare the aforementioned homopolymers, hydrogenated products of such copolymers, ethylene-propylene co- and terpolymers and ethylene vinyl acetate copolymers, may be designed with appropriate cohesive energy densities to absorb organic wastes. In addition, polar comonomers such as acrylonitrile acrylic acid, or maleic anhydride may be employed when a higher affinity to an inorganic filler is desired. Other classes of polymers, which may be employed, include silicone elastomers and highly substituted cellulose or starch ethers. Various other polymers which may be used include carboxylated polystyrene-butadiene copolymer, hydrogenated polystyrene-butadiene copolymer, ethylene-propylene co- and terpolymers, terpolymers of styrene, vinyl pyridine and butadiene and copolymer of vinyl chloride and acrylic esters. All of the polymers utilized in this invention should exhibit hydrophobic properties and limited water solubility; i.e. they should exhibit at least a 10% swelling when contacted with a hydrophobic waste material.

In addition, to the polymer exhibiting a high affinity for hydrophobic wastes, it is preferred that a polymer backbone be structured to remain stable for extended time periods in the waste environment. Biodegradable materials such as polyesters should not be employed.

Applicants' invention uses a dispersion of hydrophobic polymer particles in a continuous liquid phase. In the preferred embodiment, the dispersion is formed via emulsion polymerization. In a typical emulsion polymerization, a hydrophobic monomer or monomer blend is dispersed in a continuous aqueous phase using an emulsifier, followed by polymerization with a water-soluble free-radical initiator. The product formed is a colloidal dispersion of the polymer called a latex. The terms latex, polymer colloid and polymer emulsion are used synonymously herein. A description of the reactions, equipment and products can be found in the Encyclopedia of Polymer Science and Engineering, Volume 6; John Wiley and Sons.

The particle size in latexes produced by emulsion polymerization is determined by such factors as the reactor design, operating temperatures, emulsifier, free-radical concentration and monomer choice. Generally, particle size ranges from a diameter of 10 nm to 20 $\mu$m. Under special conditions, particles having diameter as large as 100 $\mu$m may be produced. For applicants' invention, the smaller the particle the greater the surface area available for absorbing organic wastes and coating matrix material such as clay. Latexes with polymer particles smaller than 100 $\mu$m in diameter are preferred in both the waste solidification and liner technique processes.

In commercial production, the polymer is often recovered from the latex. However, for applicants' purposes, it is preferred that the colloidal dispersion is maintained. The presence of emulsifiers and stabilizers used during the polymerization reaction contribute to both the stability of the latex and to adsorption of the polymer on to the matrix material. Selection of appropriate emulsifiers is within the knowledge of those skilled in the art. A large number of emulsifiers are commercially available. A listing of several thousand are contained in the "Detergent and Emulsifier Annual" J. W. McCutcheon, Inc., Morristown, N.J.

In conventional emulsion polymerization, a water miscible or aqueous continuous liquid phase is used. Water miscibility is important in practicing applicants' invention when blending the latex with moist clay and when mixing the latex with a liquid waste having aqueous components.

While emulsion polymerization is particularly well suited to producing a latex, it should be noted that there may be other methods for producing a latex which can be used in applicants' process. For example, ultra sonic dispersion of a polymer in a continuous liquid phase, or dispersion of minute, spray dried particles in a continuous liquid phase may be adapted to applicants' process.

Waste Solidification

In a preferred embodiment of the invention, the nonpolar, organic components of a hazardous liquid waste may be isolated and converted to a form suitable for storage. The particular polymers utilized for the absorption process as well as the amount used will be dependent on the nature of the waste products being treated for storage, the storage configuration, cost, et cetera. Dispersions of hydrophobic polymer particles in liquids are used effectively in extracting organic wastes from aqueous mixtures. Mixtures of polymers may be used to control complex waste mixtures.

The first step of the process is to absorb the organic components with a hydrophobic polymer. The hydrophobic polymer is dispersed in a continuous liquid phase as previously described. In most applications the liquid phase will be water miscible or aqueous to allow the suspension to be easily mixed with an aqueous liquid waste. High sheer mixing of the suspension and liquid waste is desirable. Since the efficiency of the waste sorption increases as the size of the absorbant decreases, one does not have to guard against size reduction during mixing. Further, mixing need not be energy intensive since the bulk viscosity of the emulsified polymer is low, and it is not essential that a homogenous mixture be obtained. In some cases it may be desirable to spray the latex on the surface of a liquid waste. The term forming a mixture is meant to include any process by which the latex is contacted with the liquid waste.

After mixing the latex and liquid waste, the polymer particles are agglomerated by adsorption on a matrix material. The matrix material is preferably a finely divided, porous, inorganic material. Kiln dust appears to be well suited for this process. Similar effects can be achieved with fumed silica, clays and cement dust. There are many ways to contact the matrix material with the polymer particles such as agitation, high speed mixing or spraying the matrix material on the surface. Other methods of phase contacting and liquid-solid mixing are well known to those with skill in the art and may be employed.

The matrix material and adsorbed polymer particles can then be separated from the unabsorbed liquid in the mixture. This solidified waste can be recovered as sediment in a settling pond, filtered from a waste process stream or expressed by compression. Also within the scope of applicable sedimentation processes is included centrifuging. If a buoyant matrix material is used, it may also be possible to achieve phase separation by skimming a vessel. The term separation is intended to include any method, even gravity sedimentation, by which the matrix material and adsorbed polymer are removed from suspension. Instead of being recovered, the settled material may be allowed to line the bottom of a hazardous waste pit. If the solidified waste is recovered, it has the consistency of a rubbery clay. It can be molded and allowed to harden.

Phase separation of the matrix material and adsorbed polymer particles may not be necessary in every application. For example, if the liquid waste were composed entirely of hydrophobic liquid waste, then enough of the latex could be added to completely absorb the waste. The continuous liquid phase comprising the latex could be allowed to evaporate or it might be absorbed by the matrix material. In that case there would be no unabsorbed liquid remaining.

The efficacy of the solidification process is demonstrated by the following experiment. Perchloroethylene, 20 g, in which was dissolved an organosoluble red dye, was mixed throughly with 10 g of a carboxy-modified sytrene-butadiene latex (Goodright 2570X59) which contained 52.5% solids. The perchloroethylene was imbibed by the latex as evidenced by the transport of the dye into the aqueous phase. The liquid latex blend was solidified by adding 10 g of kiln dust and mixing thoroughly. Within 60 seconds a plyable solid was obtained; no free liquid could be detected. The solidified material was placed on a paper towel and squeezed. No transfer of the dye to the towel could be detected and no free liquid was exuded.

Liner Techniques

A solution to the problems encountered with lining clay pits with plastic sheets is a further utilization of this invention. Blending a latex with clay followed by compacting the mixture on the surface of a land fill reduces the permeability of both aqueous and non-polar organic wastes by one to three orders of magnitude as determined by standard test procedures. The polymer additive protects the clay from attack and the modified clay liners remain intact when subjected to alternating exposures to organic solvents and aqueous solutions. Incorporation of as little as 0.5% by weight of polymer solids will reduce the permeability of a clay liner over one thousand fold. While efficacy decreases as the wt. % of polymer solids decreases, even trace amounts of polymer as low as 0.1%, incorporated in the clay will reduce permeability. Of course, greater concentrations of polymer solids can be used in the liner technique. It is believed that by incorporating more than 5-10 wt. % polymer solids, one encounters diminishing returns, i.e. the increases in efficacy no longer justify increased material costs. The engineering required is straightforward and the product is self-sealing, inert, ductile and readily applied for cell covers as well as cell liners.

It is also within the scope of this invention to use the modified clay liner in conjunction with existing liner technology. For example, the modified clay liner could be used with geomembranes or a modified clay liner could be used with traditional untreated clay liners.

In the preferred embodiment a latex comprising hydrophobic polymer particles dispersed in a continuous liquid phase is blended with clay. The continuous liquid phase is preferably an aqueous solution. However, any liquid which is miscible in water can be used with the moist clay. The clay need not be dehydrated and will work satisfactorily in its naturally moist state. Other finely divided, inorganic matrix material may also be used such as kiln dust, fumed silica and cement dust. The hydrophobic polymer particles are agglomerated by adsorption on to the matrix material. Considering the large volume of matrix material needed to line a hazardous waste pit with a 6"-8" thick layer, any matrix material should be relatively inexpensive. However, the need for multiple clay layers will be reduced due to the enhanced absortivity of the polymer modified clay. The latex and clay can be blended together in traditional cement mixing equipment. The blend can then be transported by truck, graded and compacted with a roller. Some liquid may be lost from the blend during handling with no decrease in efficacy of the liner. Other methods for contacting the latex with clay to form a modified clay liner may be used by those with skill in the art. For example, the hydrophobic polymer particles in a latex may be adsorbed onto the clay by spraying the latex on the clay after the clay has been spread out in the pit. While this method does not provide the bulk protection that blending the latex and clay prior to compacting does, coating of the clay with the hydrophobic polymer is still possible and thus improved waste retention characteristics are achieved.

Fixed-wall permeater tests conducted using standard illitemontmorillonite clay demonstrate clearly the impact of non-polar, polymer additives on clay porosity. Samples of the clay were compacted to the same density and degree of saturation, then subjected to standard permeability tests using one of the procedures defined under EPA Method 9100. Pure clay samples (no polymer added) were used as a control. The test samples were blended with various known contents of polymer solids, expressed herein as a percentage of soil solids weight. The sample properties and the results from the tests are summarized in FIG. 3. The actual test sequence was as follows:

1) Permeate the sample with water until a steady-state condition was achieved, to determine the sample's permeability with respect to water ($K_w$).
2) Remove the water from the permeate system (but not from the sample), introduce a chemical into the system, and permeate the sample with chemical until no difference in the permeation rate could be detected, i.e. a steady-state condition was achieved. Normally, this phase of the test was continued for several hundred hours past arrival at steady-state. The permeability with respect to the chemical ($K_c$) was determined under steady state conditions.
3) Replace the chemical in the system to see if there were any self-sealing tendencies.

In one test series, pure tetrachloroethene (Perchlor) was used as the permeant. Perchlor is known to desiccate and induce fissures in clay beds; in our tests, the Perchlor broke through pure clay within 80 hours. In contrast, no break-through was observed with any of the polymer modified clays after up to 500 hours of exposure. The second test series employed saturated sodium chloride brine because of the extensive disposal of brine drilling muds. The brine broke through a pure clay liner within 600 hours; no break-through was detected after more than 1000 hours when polymer modified clay liners were tested. The enhanced retentivity of aqueous brines by the modified clays is an unexpected but highly significant property of the liners described in this invention.

Figure 2:
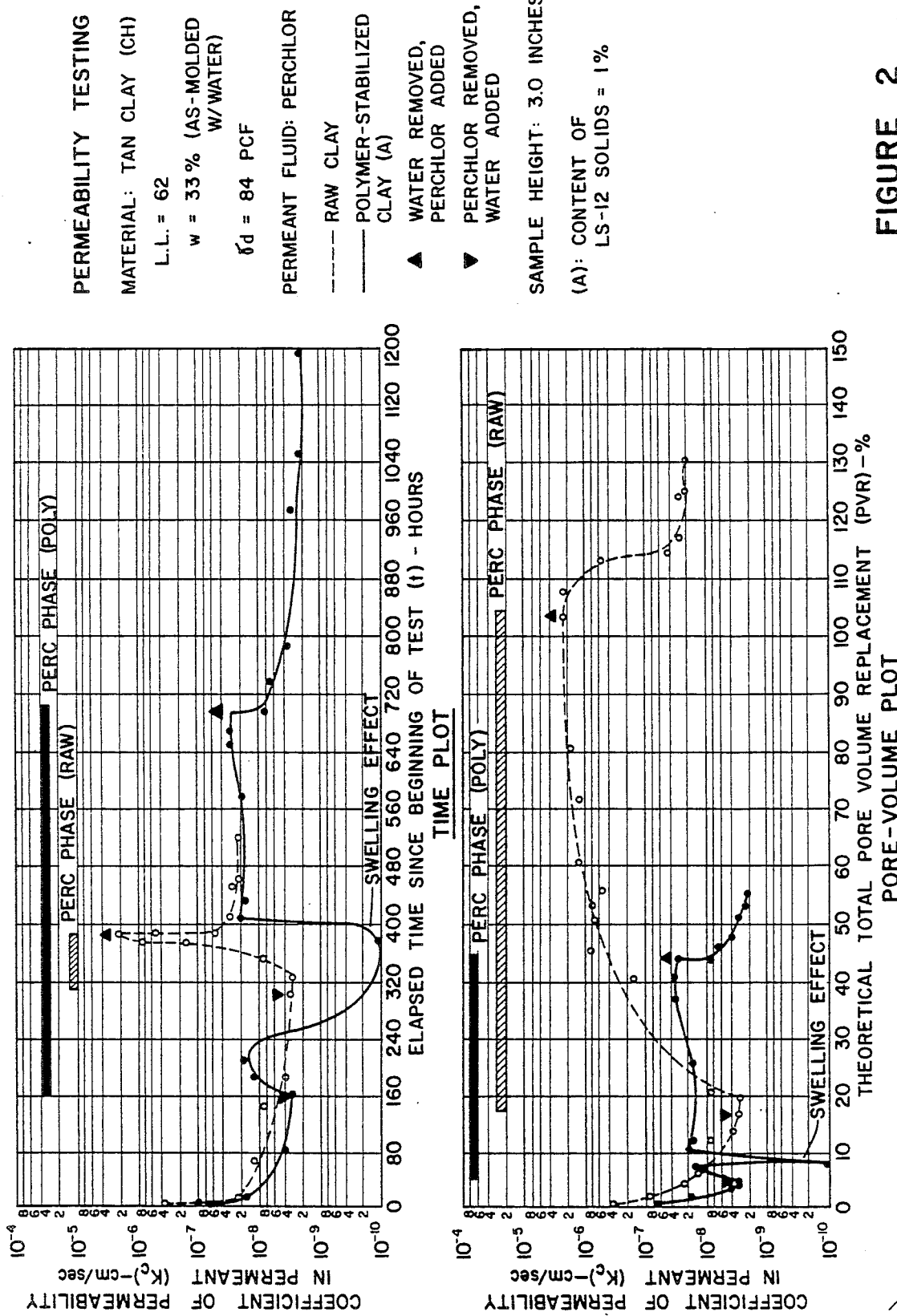

Detailed results of one test (using 100% Perchlor) are illustrated in FIG. 1, and of another test (using saturated brine) in FIG. 2. Many of the tests exhibited similar overall behavior patterns. The typical pattern when a chemical is introduced is as follows:

1) an initial change in permeability (Perchlor increases permeability, brine decreased permeability) which is relatively small, less than one order of magnitude;
2) swelling of the sample, resulting in an apparent decrease in permeability; and
3) an increase in the permeability to some relatively stable value.

The true measure of the polymer-modified clay effectiveness is the ratio of the stable value with the chemical as the permeant to the value observed with water ($K_c/K_w$). This ratio is over 1000 for the tests on pure clay samples. With polymer-stabilized clays, it was about 1.0 (no effect) with polymer contents of 2-5% by weight, increasing to about 8 with 0.5% polymer solids. Clearly for the chemicals evaluated, the permeability of the stabilized clay is hardly affected by chemical attack. The effects range from "no effect" to 1% of the effect on raw clay. A self-sealing action is also evident when water is reintroduced to the polymer-modified system.

Application of several clay-polymer layers using polymers with different cohesive energy densities will produce modified cell liners with a high degree of integrity. Multivarient polymer liners will contain diverse waste mixtures, and minimize diffusion of ground water into the land fill. The seal is enhanced by contact with the waste products which swell the polymer, seal the pores and plasticize the coating to eliminate cracking.

The technology can be extended to injection wells by injecting a slurry of absorbative hydrophobic polymer prior to waste injection. An impermeable barrier will form when the coated underground formation is treated with waste products.

There are of course many obvious alternate embodiments not specifically mentioned but which are intended to be included within the scope of this invention as defined by the following claims.

What is claimed is:

1. A process for lining a hazardous waste pit capable of containing liquid organic waste and brine solution, comprising the steps of: forming a blend by mixing a finely divided, inorganic matrix material and a hydrophobic liquid absorbing, polymer particles dispersed in a continuous, water miscible, liquid phase, wherein said polymer particles in said blend are adsorbed on to said matrix material; and compacting said blend to form a layer on a surface of said pit.

2. A process according to claim 1, wherein said inorganic matrix material is selected from the group consisting of kiln dust, fumed silica, cement dust and clay.

3. A process according to claim 1, wherein said inorganic matrix material is clay in its naturally moist state.

4. A process according to claim 1, wherein said polymer particles have an average diameter of between 10 nm and 20 um.

5. A process according to claim 1 wherein said polymer particles are product of emulsion polymerization.

6. A process according to claim 5, wherein said polymer particles comprise less than 10% by weight of said blend.

7. A process according to claim 5, wherein said polymer particles comprises between 0.1 and 5.0% by weight of said blend.

8. A process according to claim 7, wherein said continuous liquid phase is aqueous.

9. A process according to claim 6, wherein said polymer particles comprise a polymer selected from the group consisting of polyvinyltoluene, polyalkylstyrenes, carboxylated polystyrenes, alkoxylated polystyrenes and halogenated polystyrenes, as well as polyvinyl chloride, polyisobutylene, polybutadiene, polychloroprene, polyalkylmethacrylates and acrylates, polyvinyl pyridines and polyvinyl ethers, copolymers derived from various combinations of the monomers for these homopolymers, hydrogenated products of such copolymers, ethylenepropylene co- and terpolymers, ethylenevinyl acetate copolymers, silicone elastomers, cellulose ethers, and copolymers having long alkyl side chains wherein each of said polymers has hydrophobic characteristics.

10. A process according to claim 6, wherein said polymer is a hydrophobic carboxylated polystyrenebutadiene copolymer.

11. A process according to claim 6, wherein said polymer is polystyrene.

12. A process according to claim 6, wherein said polymer has long alkyl side chains.

13. A process according to claim 6, wherein said polymer is a copolymer containing acrylonitrile, acrylic acid or maleic anhydride.

14. A process according to claim 6, wherein said polymer is a copolymer of vinyl chloride and acrylic esters.

15. A process according to claim 6, wherein said polymer is a terpolymer of sytrene, vinyl pyridine and butadiene.

16. A process according to claim 6, wherein said polymer is hydrogenated polystyrene-butadiene copolymer.

17. A process according to claim 6, wherein said polymer is an ethylene-propylene co- or terpolymer.

18. A process according to claim 6, wherein said polymer is selected from a group of polymers which swell at least 10% when absorbing said liquid organic waste.

19. A process according to claim 6, wherein said polymer is selected from a group of polymers that will absorb at least its own weight in liquid organic waste.

20. In a hazardous waste pit, a liner capable of containing liquid organic waste and brine solutions, comprising a blend formed by mixing a finely divided, inorganic matrix material and a hydrophobic liquid absorbing, polymer particles dispersed in a continuous water miscible, liquid phase, wherein said polymer particles in said blend are adsorbed onto said matrix material, said blend being compacted to form a layer on a surface of said pit.

21. A liner according to claim 20, wherein said inorganic matrix material is selected from the group consisting of kiln dust, fumed silica, cement dust and clay.

22. A liner according to claim 20, wherein said inorganic matrix material is clay in its naturally moist state.

23. A liner according to claim 20, wherein said polymer particles have an average diameter of between 10 nm and 20 um.

24. A liner according to claim 20 wherein said polymer particles are product of emulsion polymerization.

25. A liner according to claim 24, wherein said polymer particles comprise less than 10% by weight of said blend.

26. A liner according to claim 24, wherein said hydrophobic polymer particles comprise between 0.1 and 5.0% by weight of said blend.

27. A liner according to claim 26, wherein said continuous liquid phase is aqueous.

28. A process for lining a hazardous waste pit capable of containing liquid organic waste and brine solution, comprising the steps of lining a surface of said pit with a layer of a finely divided, inorganic matrix material and contacting said matrix material with sufficient hydrophobic liquid absorbing polymer particles to cause said particles to become adsorbed thereon and to form a pittliner.

29. A process according to claim 28 wherein said polymer particles are adsorbed on to said layer of matrix material by coating said layer with said polymer particles dispersed in a continuous water miscible liquid phase.

30. A process according to claim 29, wherein said inorganic matrix material is selected from the group consisting of kiln dust, fumed silica, cement dust and clay.

31. A process according to claim 29, wherein said inorganic matrix material is clay in its naturally moist state.

32. A process according to claim 29, wherein said polymer particles have an average diameter of between 10 nm and 20 um.

33. A process according to claim 29 wherein said product of emulsion polymerization.

34. A process according to claim 3, wherein said polymer particles comprise less than 10% by weight of said blend.

35. A process according to claim 33, wherein said hydrophobic polymer particles comprises between 0.1 and 5.0% by weight of said blend.

36. A process according to claim 35, wherein said continuous liquid phase is aqueous.

* * * * *